(No Model.)

W. M. LINDSAY.
TENNIS MARKER.

No. 487,951. Patented Dec. 13, 1892.

Witnesses
Harry L. Amer.
Chas. S. Hyer.

Inventor
W. M. Lindsay.
By his Attorneys,
C. A. Snow & Co.

UNITED STATES PATENT OFFICE.

WALTER MANVILLE LINDSAY, OF WEST DERBY, VERMONT.

TENNIS-MARKER.

SPECIFICATION forming part of Letters Patent No. 487,951, dated December 13, 1892.

Application filed August 11, 1892. Serial No. 442,834. (No model.)

*To all whom it may concern:*

Be it known that I, WALTER MANVILLE LINDSAY, a citizen of the United States, residing at West Derby, in the county of Orleans and State of Vermont, have invented a new and useful Tennis-Marker, of which the following is a specification.

This invention relates to certain new and useful improvements in marking devices, more especially adapted for laying out tennis courts and lines of playing-fields, and has for its object to simplify the construction of such form of devices and provide an accurate operation without the application of skill in the manipulation of the same; and with this object in view the invention consists of the construction and arrangement of the parts, as will be more fully hereinafter described and claimed.

Figure 1:
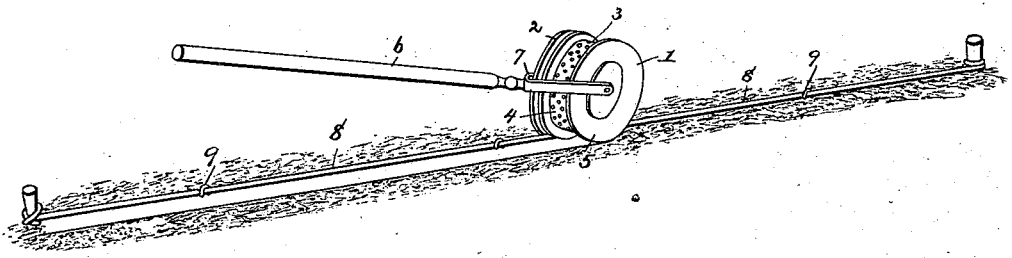
Figure 2:
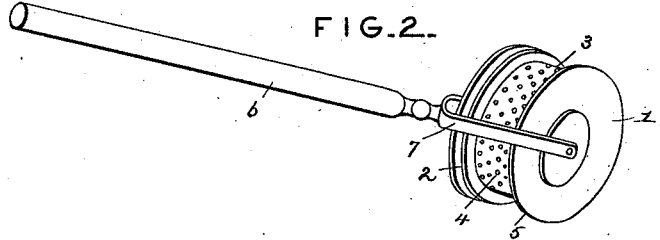
Figure 3:
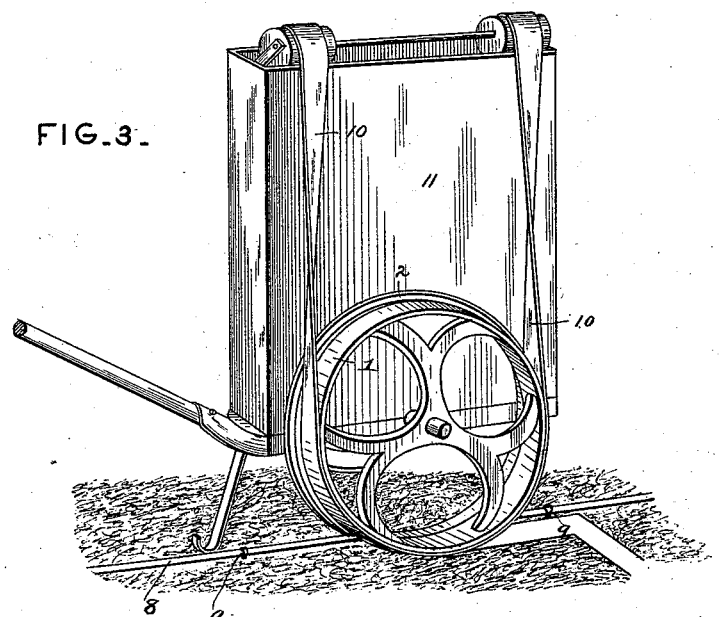

In the drawings, Figure 1 is a perspective view of the improved device shown in position for marking. Fig. 2 is a perspective view of the marking-wheel detached. Fig. 3 is a perspective view of a slightly-different form of construction.

Similar numerals of reference are employed to indicate corresponding parts in the several figures.

Referring to the drawings, the numeral 1 designates a marking-wheel, which, as constructed in Figs. 1 and 2, is adapted for the application of dry material, and, as shown in Fig. 3, is adapted to have a feeding-belt surrounding the same to convey wet or moist marking material to the ground. As shown in both of the forms, a grooved extension or wheel is provided, as at 2, and secured to one side of the wheel 1.

The device shown by Figs. 1 and 2 for carrying the marking material consists of a cylinder 3, with a perforated rim 4, having side flanges 5, and an operating-handle 6, secured to a yoke 7, and the latter axially attached to the said cylinder, so that the latter may have free rotation and perform the marking operation by a rotation thereof over the surface of the ground. In this form of the device the dry material is placed within the cylinder 3 and sifts or passes through the perforated rim 4, and the side flanges 5 of said cylinder make the line of regular formation and parallel on opposite sides by confining the dry material as delivered from the cylinder between the same. In connection with the construction thus far set forth a line 8 is employed and secured at its opposite ends by suitable stakes in the direction and location the mark is desired to be made and against the surface of the ground. To hold the said line 8 in proper position, a series of staples 9 may be employed and which are driven thereover, as fully shown in Fig. 1. This line 8 forms a guide-track, which is engaged by the grooved wheel or extension 2, secured to or connected with the wheel 1, and enables the operator to quickly and accurately form the mark or properly deposit either the dry or wet marking material in the manner desired without skillful guidance of the marking-wheel. The grooved wheel or extension 2 will be formed of such relative depth as to bring the marking portion of the wheel 1 always in contact with the surface of the ground and at all times insure a perfect marking operation.

In Fig. 3 a belt 10 travels over the wheel 1 in such manner as to convey wet or moist material from a receptacle 11, through which it also has movement, the said belt being actuated by the revolution of the said wheel 1. In this instance the line 8 is also employed as a guide-track, and in both forms of devices when a mark is adapted to be applied to the surface of the ground in a different or another direction the line may be released and in a similar manner applied elsewhere.

The device heretofore set forth, as before stated, avoids the employment of any great amount of skill or accurate manipulation to accomplish the desired result, and is comparatively inexpensive in manufacture and sale.

It will be understood that the marking device herein set forth can be used upon any surface desired, whether indoors or out of doors, and that the guide-line may be of any suitable material and be arranged in connection with the surface to which the mark is to be applied in any suitable manner.

Having thus described the invention, what is claimed as new is—

1. In a marking device of the character set forth, the combination of a wheel for applying the marking material, having a groove on one side thereof, and a guide-line adapted to be secured in position and engaged by the grooved portion of said wheel, substantially as described.

2. In a marking device of the character set forth, the combination of a wheel having a cylinder therein with a perforated rim and a grooved wheel on one side thereof and a guide-line applied to the surface to be marked and adapted to be engaged by said grooved wheel, substantially as described.

In testimony that I claim the foregoing as my own I have hereto affixed my signature in the presence of two witnesses.

WALTER MANVILLE LINDSAY.

Witnesses:
H. D. LINDSAY,
C. I. WORBY.